United States Patent [19]
Fuhrer

[11] 3,963,864
[45] June 15, 1976

[54] PICKUP ARM ASSEMBLY

[75] Inventor: Jack Selig Fuhrer, Princeton Jct., N.J.

[73] Assignee: RCA Corporation, New York, N.Y.

[22] Filed: Aug. 12, 1975

[21] Appl. No.: 603,805

Related U.S. Application Data

[63] Continuation of Ser. No. 522,813, Nov. 12, 1974, abandoned.

[52] U.S. Cl. .......................... 178/6.6 R; 274/23 R
[51] Int. Cl.² .......................................... G11B 3/02
[58] Field of Search .......... 178/6.6 R; 179/100.4 M, 179/100.1 B; 274/23 R, 37, 29

[56] References Cited
UNITED STATES PATENTS

| | | | |
|---|---|---|---|
| 3,294,404 | 12/1966 | Cavagnaro | 274/23 R |
| 3,328,036 | 7/1967 | Reed et al. | 274/23 R |
| 3,734,511 | 7/1971 | Rabinow | 274/23 R |

*Primary Examiner*—Vincent P. Canney
*Attorney, Agent, or Firm*—Eugene M. Whitacre; William H. Meagher; Dilip A. Kulkarni

[57] ABSTRACT

A pickup arm has an intermediate portion interconnecting a first end portion and a second end portion. An end of the first end portion is secured to a supporting structure of a disc record player. During playback the first and second end portions are substantially parallel to the turntable surface of the player, and the intermediate portion positions the second end portion near the turntable surface. A signal pickup holder carrying a signal pickup is pivoted to an end of the second end portion remote from the pickup arm supported end in a manner that normally aligns the axes of the holder and the second end portion. During playback the intermediate portion positions the second end portion remote end, carrying the signal pickup holder pivot, as near to a disc record disposed on the turntable surface as practicable, in order to reduce the angle included between (a) the disc record surface, and (b) a line joining the signal pickup tip and the signal pickup holder pivot, thereby reducing deleterious, forward and backward displacement of the signal pickup along the disc record spiral groove as a result of up and down motion of the signal pickup in the spiral groove.

3 Claims, 3 Drawing Figures

PICKUP ARM ASSEMBLY

This is a continuation of application Ser. No. 522,813, filed Nov. 12, 1974, now abandoned.

The present invention relates to an improved pickup arm assembly compatible with mechanical and electrical requirements of a video disc playback system.

In certain video disc systems video information is recorded by means of geometric variations in the bottom of a smooth spiral groove on the surface of a disc record. The disc record surface includes a coating of conductive material which is preferably covered with a thin deposit of dielectric material. A signal pickup, supported at one end of a pickup arm, engages the spiral groove and includes a conductive electrode which establishes a capacitance with the conductive coating and the dielectric deposit of the disc record. When the disc record is rotated, the electrode-disc capacitance varies in response to the geometric variations in the bottom of the spiral groove passing beneath the signal pickup. The capacitance variations are converted to electrical signal variations by suitable signal processing circuitry coupled to the pickup electrode. The output signal of the signal processing circuitry may be coupled to a conventional television receiver for reproduction. The other end of the pickup arm is flexibly mounted by a pickup arm support to a supporting structure of the playback system. A system of the aforementioned type is described in detail in U.S. Pat. No. 3,842,194, issued on Oct. 15, 1974 to Jon K. Clemens.

Video disc systems of the aforementioned type generally utilize disc records having groove densities in the order of four to 8,000 groove convolutions per inch. A typical video disc record of this type may have a groove convolution spacing in the order of 3.5 microns. The fragile walls of relatively narrow grooves of the disc record cannot be dependably relied upon to pull the pickup arm assembly, around the pickup arm pivot support, across the entire recorded surface of the disc record. Also, in video disc systems utilizing the variable capacitor concept, it is desirable for accurate reproduction of the prerecorded signals that the signal pickup electrode maintain a substantially constant attitude in the spiral groove. Therefore, the supporting structure includes a radial feed drive mechanism for traversing the supported end of the pickup arm in proper time relationship with the radial motion of the signal pickup tip engaged in the spiral groove so as to continuously maintain the longitudinal axis of the pickup arm substantially tangential to the spiral groove at the point of engagement. Reference may be made to the copending U.S. application of F. R. Stave, Ser. No. 351,600, filed Apr. 16, 1973, and entitled "Video Disc Playback Apparatus" for an illustration of a suitable radial feed drive mechanism for providing the indicated radial motion.

Further, in the above-mentioned type video disc systems it has been recognized that the relative motion between the disc record and the signal pickup should be maintained at a predetermined speed, and within specified tolerance limits (e.g., 450 rpm, ±0.01 percent), in order to obtain high fidelity of reproduction of th prerecorded signals. The predetermined speed and the specified tolerance limits are also necessary to assure that the horizontal and vertical synchronizing information is stable and within the lockup range of the deflection circuits of the television receiver. Moreover, when the prerecorded information is a color television signal with chrominance information recorded as a modulated carrier signal, the recovered signal must be stable and within the lockup range of the color processing circuits of the playback system in order to reduce color phase distortion.

The disc record/signal pickup relative speed may be maintained at the predetermined speed, and within the specified tolerance limits by rendering the pickup arm support subject to cyclical, translatory motion along the longitudinal axis of the pickup arm in a manner that opposes deviations of the instantaneous relative speed from the predetermined speed. Illustratively, the means for imparting translatory motion to the support member may be of the type disclosed in the U.S. Pat. No. 3,711,641, issued to R. C. Palmer on Jan. 16, 1973, entitled "Velocity Adjusting System".

Additionally, in an advantageous pickup arrangement for video disc systems of the aforementioned type, the pickup arm is formed of conductive material, and is enclosed in a conductive cage, so that the conductive pickup arm and the surrounding conductive cage may serve respectively as an inner and outer conductor of a transmission line. The transmission line is capacity end loaded at the pickup arm supported end by a series combination of capacitances which include an air dielectric capacitor and a voltage variable capacitor. The transmission line is also capacity end loaded at the signal pickup end by a combination of capacitances which include the signal pickup electrode/disc record conductive coating variable capacitance. The transmission line and associated capacitance form a tuned circuit with a resonant frequency subject to variation as the signal pickup electrode/disc conductive coating capacitance varies. The tuned circuit is excited with UHF oscillations from a fixed frequency oscillator of the signal processing circuitry operating at a frequency (e.g., 915 MHz) within an ISM-allocated band. As the resonant frequency of the tuned circuit varies, the resultant UHF oscillation amplitude variations are detected by the signal processing circuitry detector to recover the prerecorded information. Reference may be made to the copending U.S. application of D. J. Carlson, et al., Ser. No. 451,103, filed Mar. 14, 1974, and entitled "Pickup Apparatus for Video Disc Players" for a detailed discussion of such a transmission line arrangement and signal processing circuitry appropriate for use therewith.

Thus, in systems of the aforementioned type the pickup arm performs a dual function: (1) it mechanically supports the pickup electrode in signal transfer relation with the disc record during playback, and (2) it forms an electrical transmission line with the surrounding conductive cage so that the prerecorded signals may be recovered. The present invention is concerned with improvements in pickup arms of the aforementioned type which may serve both mechanical and electrical functions.

First, in connection with the pickup arm's mechanical function, it is herein recognized as desirable to reduce the angle included between (1) the disc record surface and (2) a line joining the signal pickup tip and an effective pivot for high frequency, vertical arcuate motion of the signal pickup in the spiral groove, in order to reduce random forward and backward displacement of the signal pickup along the disc record spiral groove as a result of spurious, high frequency, up-and-down motion of the signal pickup in the spiral groove (e.g., due to "orange peel" roughness of the disc groove surface etc.). The random shifting of the signal pickup along the spiral groove results in deleterious fluctuation of relative speed therebetween, thereby causing flickering or jitter of the picture projected on the television screen (which is analogous to "wow" in audio playback systems). Pursuant to this first aspect of the present invention, the effective pivot is desirably as near to the disc record as practicable.

Also, in connection with the pickup arm's mechanical function, it is herein recognized as advantageous to dispose the center of gravity of the pickup arm substantially in line with the cyclical, translatory motion of the pickup arm support in order to reduce twisting moments on the pickup arm support when the translatory motion imparting means is activated.

Further, in reference to the conductive pickup arm's electrical function, it is herein recognized as desirable that electrical parameters (e.g., reactance) of the transmission line remain substantially free from random variations during playback throughout the range of the translatory motion of the pickup arm for accurate reproduction of the prerecorded signals.

Pursuant to an illustrative embodiment of the present invention, a pickup arm has an intermediate portion interconnecting a first end portion and a second end portion. An end of the pickup arm first end portion is secured to a translatory motion imparting means of a disc record player for varying the position of a signal pickup in relation to a disc record spiral groove in a manner that opposes deviations of signal pickup/spiral groove relative speed from a predetermined speed. During playback (1) the first and second end portions are substantially parallel to the turntable surface of the player, and (2) the intermediate portion positions the second end portion near the turntable surface rleative to the first end portion. A signal pickup holder carrying a signal pickup is pivoted to an end of the second end portion remote from the pickup arm supported end in a manner that normally aligns the axis of the holder and the second end portion. During playback the intermediate portion positions the second end portion remote end, carrying the signal pickup holder pivot, as near to the disc record as practicable in order to reduce the angle included between (a) the disc record surface and (b) a line joining the signal pickup tip and the signal pickup holder pivot, thereby reducing deleterious, forward and backward displacement of the signal pickup along the disc record spiral groove as a result of up and down motion of the signal pickup in the spiral groove.

Pursuant to a further feature of the invention, the pickup arm first end portion is (1) disposed in registry with the translatory motion of the pickup arm support, and (2) substantially longer than the remainder of the pickup arm, in order to reduce twisting moments on the pickup arm support when the translatory motion imparting means is activated.

According to a still further feature of the invention, the pickup arm first end portion is disposed substantially parallel to an enclosing conductive cage during playback throughout the range of the translatory motion of the pickup arm in order to reduce random variations in the electrical parameters of a transmission line formed by the pickup arm and the enclosing cage.

Objects, features and advantages of this invention will be more fully understood from the following detailed description of the preferred embodiment, the appended claims and the accompanying drawings, in which:

Figure 3:
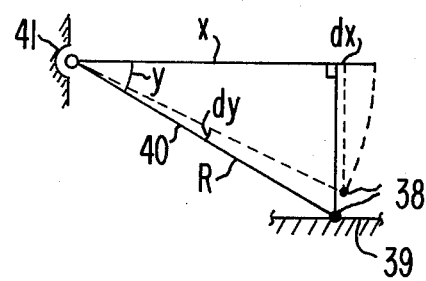

FIG. 3 diagrammatically illustrates horizontal shifting of a signal pickup along a disc record spiral groove as a result of vertical movement of the signal pickup in the spiral groove about a pivot support.

Figure 1:
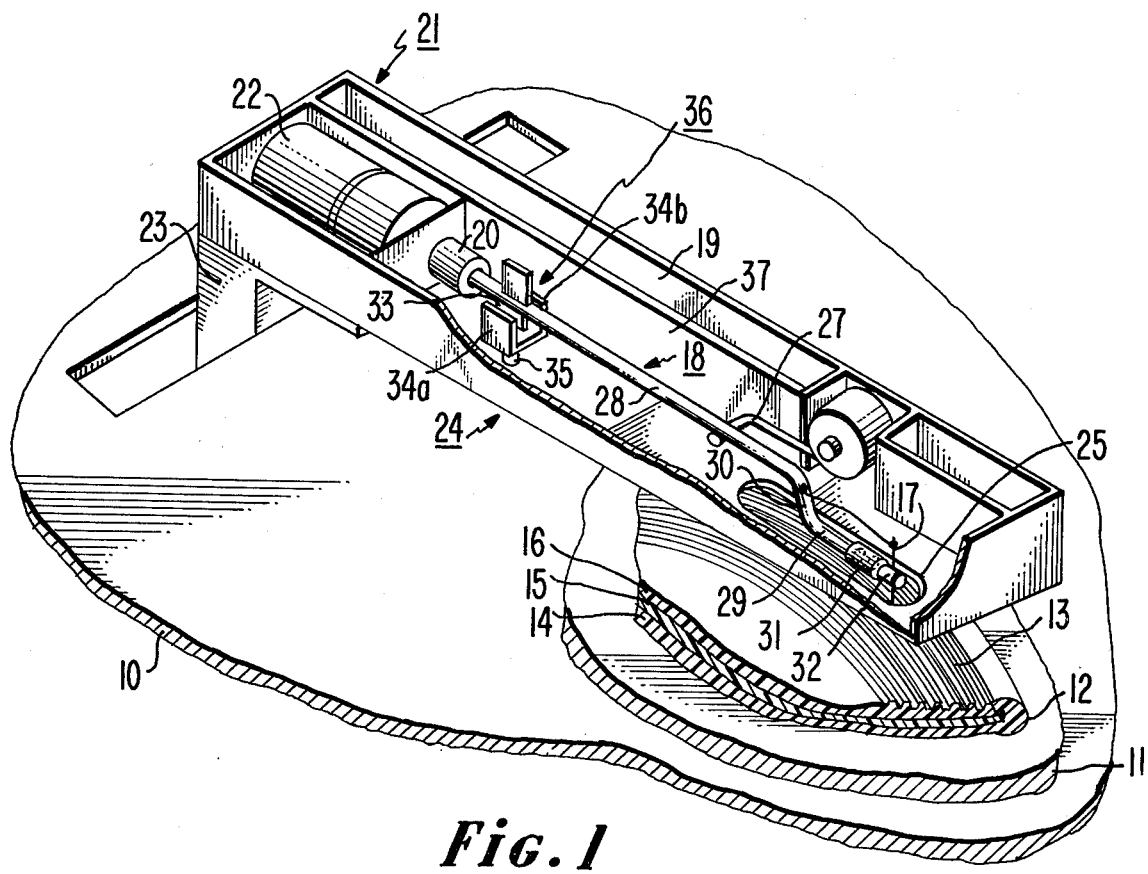
FIG. 1 is a partially cut-away view of a video disc system incorporating an illustrative embodiment of a pickup arm assembly according to the present invention.
Figure 2:
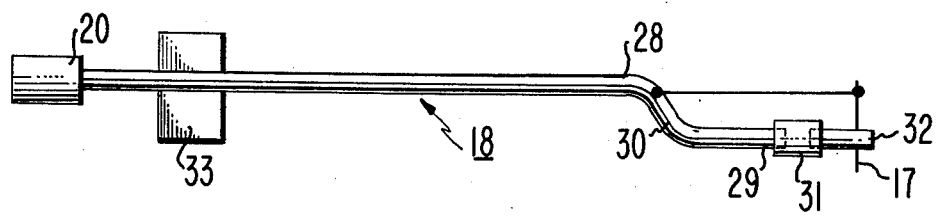
FIG. 2 is an elevation of the pickup arm assembly of FIG. 1.

Referring to the drawings, wherein like reference numerals designate similar elements in the various views, in FIGS. 1 and 2 a video disc player is shown having a turntable mounting plate 10. The player is suitable for use in a video disc system such as disclosed in the aforementioned Clemens patent. A turntable 11 is rotatably mounted on the turntable mounting plate 10. The upper surface of the turntable 11 is adapted to support a video disc record 12. Video information is recorded by means of geometrical variations in the bottom of a smooth spiral groove 13 on the substrate 14 of the disc record 12. The disc record 12 surface includes a conductive coating 15 which is preferably covered with a thin deposit 16 of dielectric material. Although the disc record 12 is shown to have recording on one side only for the purposes of simplicity, it will be seen that the disc record may as well have recording on both sides. A signal pickup 17, supported at one end of a conductive pickup arm 18, engages the spiral groove 13 and includes a conductive electrode (not shown) which, together with the conductive coating 15 and the dielectric deposit 16, form a capacitor. When relative motion is established between the signal pickup 17 and the disc record 12, an edge of the electrode included in the signal pickup, while riding in the spiral groove 13, serves as an electrode of a capacitor varying due to the geometric variations in the bottom of a smooth spiral groove passing beneath. The other end of the pickup arm 18 is flexibly supported by a pickup arm support 20 carried by a pickup arm supporting structure 21.

The pickup arm supporting structure 21 comprises a radial feed drive mechanism 23 and a translatory motion imparting means 22. As indicated before, the radial feed drive mechanism 23 traverses the pickup arm support 20 in proper time relationship with the radial motion of the signal pickup 17 tip engaged in the spiral groove 13 so as to continuously maintain the longitudinal axis of the pickup arm substantially tangential to the spiral groove at the point of engagement. Reference may be made to the aforementioned copending Stave application (Ser. No. 351,600) for an illustration of a suitable feed drive mechanism for providing the indicated radial motion.

As noted above, the translatory motion imparting means (also known as pickup armstretcher) varies the position of the signal pickup 17 along the disc record spiral groove 13 by imparting cyclical, translatory motion to the pickup arm along its longitudinal axis, via the pickup arm support 20, in a manner that opposes deviations of instantaneous relative speed from a predetermined speed. Illustratively, the translatory motion imparting means may be of the abovementioned Palmer type (U.S. Pat. No. 3,711,641).

A box-like, conductive cage 24 (shown with its lid removed for clarity) is mounted to the supporting structure 21 for enclosing the conductive pickup arm 18. During playback, the pickup arm 18 passes through an opening 25 in the bottom wall 26 of the housing to allow the signal pickup 17 to ride in the spiral groove 13. A pivotally mounted bracket 27 lifts the free end of the pickup arm 18 to disengage the signal pickup 17 from the spiral groove 13 when the player is inoperative.

The conductive pickup arm 18 has an intermediate portion 30 interconnecting a first end portion 28 and a second end portion 29 so as to form an S-shape. An end of the pickup arm first end portion 28 is yieldably secured to the translatory motion imparting means 22 by the pickup arm support 20. During playback (1) the first and second end portions (28 and 29) are disposed substantially parallel to the turntable 11 surface, and (2) the intermediate portion 30 positions the second end portion 29 near the turntable surface relative to the first end portion. The pickup arm support 20 rigidly transmits the cyclical, translatory motion to the pickup arm 18 while accommodating vertical and lateral, arcuate motion of the signal pickup 17 in the spiral groove 13. A compliant signal pickup holder support 31 secures a signal pickup holder 32, carrying the signal pickup 17, to an end of the pickup arm second end portion 29 remote from the pickup arm support 20 in a manner that normally aligns the axes of the holder and the second end portion. The compliant signal pickup holder support 31 also rigidly transmits the cyclical, translatory motion of the pickup arm 18 to the signal pickup holder 32 while accommodating vertical and lateral, arcuate motion of the signal pickup 17 in the spiral groove 13.

The compliant signal pickup holder support 31, being located adjacent to the pickup 17, reduces the pickup arm assembly mass which must follow relatively high frequency, vertical and lateral movements of the signal pickup in the spiral groove 13. The compliant signal pickup holder support thus accommodates relatively high frequency motion of the signal pickup (e.g., due to orange-peel-like rough surface of the spiral groove), while the pickup arm support 20 accommodates relatively low frequency motion of the pickup (e.g., due to disc mounting eccentricity, warpage, etc.).

FIG. 3 diagrammatically illustrates horizontal displacement of a signal pickup tip 38 along a disc record spiral groove 39 as a result of vertical movement of the signal pickup in the spiral groove about an effective pivot 41. A line joining the signal pickup tip 38 and the effective pivot 41 is designated by a reference numeral 40. The line 40 has a length dimension "R" and subtends an angle "$y$" with the horizontal disc record surface 39. A horizontal position "$x$" of the signal pickup tip 38 with respect to the pivot 41 is given by the equation $x = R \cos y$. Therefore, horizontal displacement $dx$ of the signal pickup tip 38 due to vertical movement, which causes a change $dy$ in the angle subtended by the line 40 with the horizontal axis, is given by the equation $|dx| = R (\sin y) dy$. Thus, the signal pickup displacement $dx$ increases with the angle $y$.

In the arrangement of FIGS. 1 and 2, the pickup arm intermediate portion positions the second end portion remote end, carrying the signal pickup holder support, as near to the disc record surface as practicable during playback in order to reduce the angle subtended between (a) the disc record surface, and (b) a line joining the tip of signal pickup 17 tip and the pivot point provided by signal pickup holder support 31, relative to the angle subtended between (A) the disc record surface, and (B) a line joining the tip of signal pickup 17 and the pivot point provided by the pickup arm support 20. Per the relationships discussed in connection with FIG. 3, the consequence is a reduction of deleterious forward and backward displacements of the signal pickup along the disc record spiral groove 13 that accompany high frequency, up-and-down movements of the signal pickup in the spiral groove.

The pickup arm first end portion 28 is (1) disposed in registry with the translatory motion imparted to the pickup arm support 20 by the translatory motion imparting means 22, and (2) substantially longer than the remainder of the pickup arm, in order to dispose the center of gravity of the pickup arm substantially in line with the translatory motion thereby reducing twisting moments on the pickup arm support when the translatory motion imparting means is activated.

An end of the conductive first end portion 28 remote from the pickup arm support 20 is connected to the signal pickup electrode by suitable means. In the illustration, respective ends of a lead are soldered to the conductive first end portion 28 remote end and the signal pickup 17 electrode. The conductive first end portion and the surrounding conductive cage serve respectively as an inner and outer conductor of a transmission line. The transmission line is capacity end loaded at both ends: (1) at the signal pickup 17 end by a variable capacitance corresponding to the series combination comprising (a) the varying capacitance established between the signal pickup electrode and the disc record conductive coating 15, and (b) the larger capacitance exhibited between the bottom of the conductive cage 24 and the disc record conductive coating overshadowed by the cage; and (2) at the pickup arm support 20 end by the series combination including (a) an air dielectric capacitor 36, and (b) the voltage variable capacitor (not shown).

The air dielectric capacitor 36 includes a movable capacitor plate 33, suspended from the pickup arm 18, received in an air gap between a pair of fixed capacitor plates (34a and 34b) fixedly mounted to the conductive cage bottom surface 26 by an insular post 35.

The transmission line and the associated capacitances establish a tuned circuit with resonant frequency subject to variation as the signal pickup electrode/disc record conductive coating capacitance varies. The tuned circuit is excited with UHF oscillations from a fixed frequency oscillator (not shown) of the signal processing circuitry 19 enclosed in a cage compartment 37 operating at a frequency (e.g., 915 MHz) within an ISM-allocated band. As the resonant frequency of the tuned circuit varies, the resultant amplitude variations are detected by the signal processing circuitry 19 detector to recover the prerecorded information. Reference may be made to the aforementioned, copending Carlson application (Ser. No. 451,103) for an illustration of a suitable transmission line circuit arrangement and associated signal processing circuitry.

The conductive pickup arm first end portion 28 is disposed substantially parallel to the conductive cage 24 during playback throughout the range of the translatory motion of the pickup arm in order to reduce random variations in the electrical parameters of the transmission line for accurate reproduction of the prerecorded signals.

What is claimed is:
1. In a playback system for recovering prerecorded signals from a disc record, said system including a signal pickup having a tip adapted for entry in a spiral groove of a disc record mounted on a surface of a rotatable turntable, said signal recovery being effected by said signal pickup when relative motion between said pickup and the record groove is established, said playback system also including a supporting structure and signal processing circuitry; a pickup arm assembly comprising:

a pickup arm having first and second ends; said pickup arm including a first straight portion terminating at said first end and disposed in a direction substantially parallel to said turntable surface when said pickup tip is positioned for disc groove entry;

means, secured to said supporting structure, for providing pivotal support for said pickup arm at said first end;

a signal pickup holder, said signal pickup being supported at one end of said holder;

means, secured to said second end of said pickup arm, for providing pivotal support for said signal pickup holder at an end of said holder remote from said one end; said signal pickup holder extending between said remote end and said one end in a direction substantially parallel to said straight portion of said pickup arm;

said pickup arm also including a further portion angled toward said turntable surface when said pickup tip is positioned for disc groove entry, and serving to locate said second end of said pickup arm, during record playback, in a position establishing an angle between (a) the record surface, and (b) a line joining the signal pickup tip and the effective pivot point provided for said signal pickup holder by said second-named pivotal support providing means, which angle is significantly smaller than the angle that would be established, during record playback, between (A) the record surface, and (B) a line joining the signal pickup tip and the effective pivot point provided for said signal pickup holder by said second-named pivotal support providing means if said pickup arm and said holder extended in a straight line between said pickup arm first end and said holder one end.

2. A system as defined in claim 1:

wherein the supporting structure includes translatory motion imparting means for varying the position of said signal pickup along the spiral groove in a manner that opposes deviations of the speed of said relative motion from a predetermined speed;

wherein said first-named pivotal support providing means is subject to engagement with said translatory motion imparting means during record playback; and wherein said first straight portion of said pickup arm is (1) disposed, during record playback, in substantial registry with the direction of translatory motion provided by said imparting means, and (2) substantially longer than the remainder of the pickup arm.

3. A system as defined in claim 2:

wherein said signal pickup includes an electrode which cooperates with the disc record to form a varying capacitance indicative of the prerecorded signals during record playback;

wherein said pickup arm is made of conductive material and is electrically connected to said signal pickup electrode;

wherein said first straight portion of said pickup arm is enclosed in a conductive cage during record playback;

wherein said conductive pickup arm and said conductive cage serve as respective conductors of a transmission line;

wherein a tuned circuit is established, during record playback, which includes said transmission line and the varying capacitance;

wherein during record playback, said tuned circuit is excited with energizing oscillations and response thereof is detected for recovering the prerecorded signals by said signal processing circuitry; and wherein said first straight portion of said conductive pickup arm is disposed substantially parallel to said conductive cage, during playback, throughout the range of the translatory motion provided by said imparting means.

* * * * *